(12) United States Patent
Kim

(10) Patent No.: US 12,455,323 B2
(45) Date of Patent: Oct. 28, 2025

(54) BATTERY DIAGNOSIS DEVICE, BATTERY DIAGNOSIS METHOD, BATTERY PACK, AND ELECTRIC VEHICLE

(71) Applicant: LG Energy Solution, Ltd., Seoul (KR)

(72) Inventor: Young-Jin Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 419 days.

(21) Appl. No.: 17/924,443

(22) PCT Filed: Dec. 16, 2021

(86) PCT No.: PCT/KR2021/019237
§ 371 (c)(1),
(2) Date: Nov. 10, 2022

(87) PCT Pub. No.: WO2022/145830
PCT Pub. Date: Jul. 7, 2022

(65) Prior Publication Data
US 2023/0273264 A1     Aug. 31, 2023

(30) Foreign Application Priority Data

Dec. 29, 2020   (KR) .................. 10-2020-0185698

(51) Int. Cl.
*G01R 31/392*     (2019.01)
*B60L 58/16*     (2019.01)
(Continued)

(52) U.S. Cl.
CPC ............ *G01R 31/392* (2019.01); *B60L 58/16* (2019.02); *G01R 31/3648* (2013.01);
(Continued)

(58) Field of Classification Search
CPC .............. G01R 31/392; G01R 31/3842; G01R 31/367; G01R 31/3648; B60L 58/16; H01M 10/48; H01M 2220/20
See application file for complete search history.

(56) References Cited

U.S. PATENT DOCUMENTS

2016/0254687 A1*   9/2016   Tanaka ................ H01M 10/425
                                          320/112
2017/0003352 A1*   1/2017   Barre ................... G01R 31/007
(Continued)

FOREIGN PATENT DOCUMENTS

CN         107607880 B     4/2020
JP        2004014205 A *    1/2004 ......... G01R 31/3658
(Continued)

OTHER PUBLICATIONS

International Search Report for Application No. PCT/KR2021/019237 mailed Mar. 28, 2022, pp. 1-3.
(Continued)

*Primary Examiner* — Lisa M Caputo
*Assistant Examiner* — Nyla Gavia
(74) *Attorney, Agent, or Firm* — Lerner David LLP

(57) ABSTRACT

A battery diagnosis apparatus includes a voltage sensor to generate a voltage signal indicating a battery voltage of a battery, a current sensor to generate a current signal indicating a battery current flowing through the battery and a control circuit. The control circuit determines a measured capacity curve over a predetermined set voltage range based on the voltage signal and the current signal collected at each unit time for a constant current period during which the battery is charged or discharged at a predetermined current rate over the set voltage range. The control circuit determines a measured differential curve over the set voltage range based on the measured capacity curve. The control circuit determines whether a negative electrode tortuosity of
(Continued)

the battery abnormally increased by comparing the measured differential curve with a reference differential curve.

10 Claims, 6 Drawing Sheets

(51) Int. Cl.
    *G01R 31/36*       (2020.01)
    *G01R 31/367*     (2019.01)
    *G01R 31/3842*    (2019.01)
    *H01M 10/48*      (2006.01)

(52) U.S. Cl.
    CPC ....... *G01R 31/367* (2019.01); *G01R 31/3842* (2019.01); *H01M 10/48* (2013.01); *H01M 2220/20* (2013.01)

(56) References Cited

U.S. PATENT DOCUMENTS

| | | | |
|---|---|---|---|
| 2019/0168617 A1 | 6/2019 | Ling et al. | |
| 2020/0018799 A1 | 1/2020 | Lim et al. | |
| 2020/0074297 A1* | 3/2020 | Lee | ................ G06N 3/042 |
| 2020/0185697 A1 | 6/2020 | Kim et al. | |
| 2020/0191876 A1 | 6/2020 | Shin et al. | |
| 2020/0271727 A1* | 8/2020 | Bae | ................ H01M 10/42 |
| 2020/0353465 A1 | 11/2020 | Apte et al. | |
| 2022/0075000 A1 | 3/2022 | Cha et al. | |

FOREIGN PATENT DOCUMENTS

| | | |
|---|---|---|
| JP | 201351150 A | 3/2013 |
| JP | 2017509103 A | 3/2017 |
| JP | 6323501 B2 | 5/2018 |
| JP | 2018147665 A | 9/2018 |
| JP | 2019040845 A | 3/2019 |
| JP | 201961741 A | 4/2019 |
| JP | 201996552 A | 6/2019 |
| JP | 2019113469 A | 7/2019 |
| JP | 6607167 B2 | 11/2019 |
| JP | 2020532727 A | 11/2020 |
| KR | 20190053014 A | 5/2019 |
| KR | 20190118535 A | 10/2019 |
| KR | 20200131629 A | 11/2020 |
| WO | 2015080285 A1 | 6/2015 |

OTHER PUBLICATIONS

Extended European Search Report including Written Opinion for Application No. 21915628.8 dated Mar. 21, 2024, pp. 1-6.

* cited by examiner

BATTERY DIAGNOSIS DEVICE, BATTERY DIAGNOSIS METHOD, BATTERY PACK, AND ELECTRIC VEHICLE

CROSS-REFERENCE TO RELATED APPLICATIONS

The present application is a national phase entry under 35 U.S.C. § 371 of International Application No. PCT/KR2021/019237 filed Dec. 16, 2021, which claims priority from Korean Patent Application No. 10-2020-0185698 filed Dec. 29, 2020, all of which are incorporated herein by reference.

TECHNICAL FIELD

The present disclosure relates to technology for diagnosis of abnormal degradation of a battery.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium ion batteries and the like, and among them, lithium ion batteries have little or no memory effect, and thus they are gaining more attention than nickel-based batteries for their advantages that recharging can be done whenever it is convenient, the self-discharge rate is very low and the energy density is high.

A battery gradually degrades over time by the charge, discharge and rest from the product release. The degradation of the battery appears in various aspects such as a decrease in the maximum allowable charge capacity and an increase in the internal resistance.

One of the causes of the rise of internal resistance is an increase in tortuosity of a negative electrode of the battery. The tortuosity of the negative electrode is a parameter indicating how much a flow path of a reactant ion in the negative electrode is tortuous. In the present disclosure, the tortuosity of the negative electrode may be defined as a ratio of the actual movement distance of the reactant ion to the shortest movement distance (the thickness of a negative electrode active material layer) when the reactant ion passes through the negative electrode active material layer. When the battery is a lithium ion battery, the reactant ion is a lithium ion.

The degradation of the battery causes the increased tortuosity of the negative electrode, and as the tortuosity of the negative electrode increases, the battery degrades faster due to non-uniform charge/discharge reaction at the negative electrode.

SUMMARY

Technical Problem

The inventors recognized that a capacity curve indicating a relationship between voltage and residual capacity of a battery is changed by an increase in tortuosity of a negative electrode of the battery.

The present disclosure is designed to solve the above-described problem, and the present disclosure is directed to providing a battery diagnosis apparatus, a battery diagnosis method, a battery pack and an electric vehicle in which a capacity curve of a battery having degraded from the fresh condition is obtained through a constant current procedure and/or a constant current charging procedure and used to determine whether the tortuosity of the negative electrode of the battery abnormally increased.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A battery diagnosis apparatus according to an aspect of the present disclosure includes a voltage sensor configured to measure a battery voltage across a battery and generate a voltage signal indicating the measured battery voltage; a current sensor configured to measure a battery current flowing through the battery and generate a current signal indicating the measured battery current; and a control circuit configured to collect the voltage signal and the current signal at each unit time. The control circuit is configured to determine a measured capacity curve indicating a relationship between the battery voltage and a residual capacity over a predetermined set voltage range based on the voltage signal and the current signal collected at each unit time for a constant current period during which the battery is charged or discharged at a predetermined current rate over the set voltage range. The control circuit is configured to determine a measured differential curve indicating a relationship between the battery voltage and a measured differential capacity over the set voltage range based on the measured capacity curve. The measured differential capacity is a ratio of a change in the residual capacity for each unit time to a change in the battery voltage for each unit time. The control circuit is configured to compare the measured differential curve with a reference differential curve. The reference differential curve indicates a relationship between the battery voltage and a reference differential capacity over the set voltage range when the battery is in fresh condition. The control circuit is configured to determine whether there is an abnormal increase to negative electrode tortuosity of the battery based on the comparison.

The control circuit may be configured to determine an approximate capacity curve by fitting the measured capacity curve to a polynomial function. The control circuit may be configured to determine the measured differential curve by differentiating a residual capacity of the approximate capacity curve with respect to the battery voltage.

The control circuit may be configured to determine a first voltage of interest at which a difference between the measured differential capacity of the measured differential curve and the reference differential capacity of the reference differential curve is at maximum. The control circuit may be configured to determine a signal distance between the measured differential curve and the reference differential curve over a voltage range of interest from the first voltage of interest to a second voltage of interest larger than the first voltage of interest. The control circuit may be configured to determine the abnormal increase to negative electrode tortuosity of the battery in response to the signal distance being equal to or larger than a reference distance.

The control circuit may be configured to determine the second voltage of interest to be equal to a smaller one of (i) a sum of the first voltage of interest and a reference voltage, or (ii) an upper voltage limit.

The control circuit may be configured to determine the signal distance using dynamic time warping.

The control circuit may be configured to determine a cumulative charge/discharge capacity of the battery over a total usage duration of the battery. The control circuit may be configured to determine the reference distance based on the cumulative charge/discharge capacity.

The control circuit may be configured to determine the reference distance using the following equation:

$$y = \sum_{i=0}^{m} C[i] \times x^i$$

where m is a predetermined natural number, C[i] is an $i^{th}$ predetermined positive coefficient, x is the cumulative charge/discharge capacity, and y is the reference distance.

A battery pack according to another aspect of the present disclosure includes the battery diagnosis apparatus of any of the embodiments described herein.

An electric vehicle according to still another aspect of the present disclosure includes the battery pack.

A battery diagnosis method according to yet another aspect of the present disclosure may include determining, by a control circuit, a measured capacity curve indicating a relationship between (i) a battery voltage measured across a battery and (ii) a residual capacity over a predetermined set voltage range based on a voltage signal and a current signal collected at each unit time for a constant current period during which the battery is charged or discharged at a predetermined current rate over the set voltage range; determining, by the control circuit, a measured differential curve indicating a relationship between (i) the battery voltage and (ii) a measured differential capacity over the set voltage range based on the measured capacity curve, wherein the measured differential capacity is a ratio of a change in the residual capacity for each unit time to a change in the battery voltage for each unit time; comparing, by the control circuit, the measured differential curve with the reference differential curve, wherein the reference differential curve indicates the relationship between the battery voltage and a reference differential capacity over the set voltage range when the battery is in fresh condition; and determining, by the control circuit, an abnormal increase to negative electrode tortuosity of the battery based on the comparison.

Advantageous Effects

According to at least one of the embodiments of the present disclosure, it is possible to determine whether the tortuosity of the negative electrode of the battery abnormally increased using the capacity curve obtained through the constant current procedure and/or the constant current charging procedure for the battery having degraded from the fresh condition.

According to at least one of the embodiments of the present disclosure, it is possible to determine whether the tortuosity of the negative electrode of the degraded battery abnormally increased based on a similarity (refer to a 'signal distance' described below) between a differential curve corresponding to the capacity curve obtained from the degraded battery and another differential curve associated with the fresh condition over a specific voltage range.

According to at least one of the embodiments of the present disclosure, it is possible to set a reference value (refer to a 'reference distance' described below) used to determine whether the tortuosity of the negative electrode of the degraded battery abnormally increased based on the cumulative charge/discharge capacity of the degraded battery.

The effects of the present disclosure are not limited to the above-mentioned effects, and these and other effects not mentioned herein will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Figure 1:
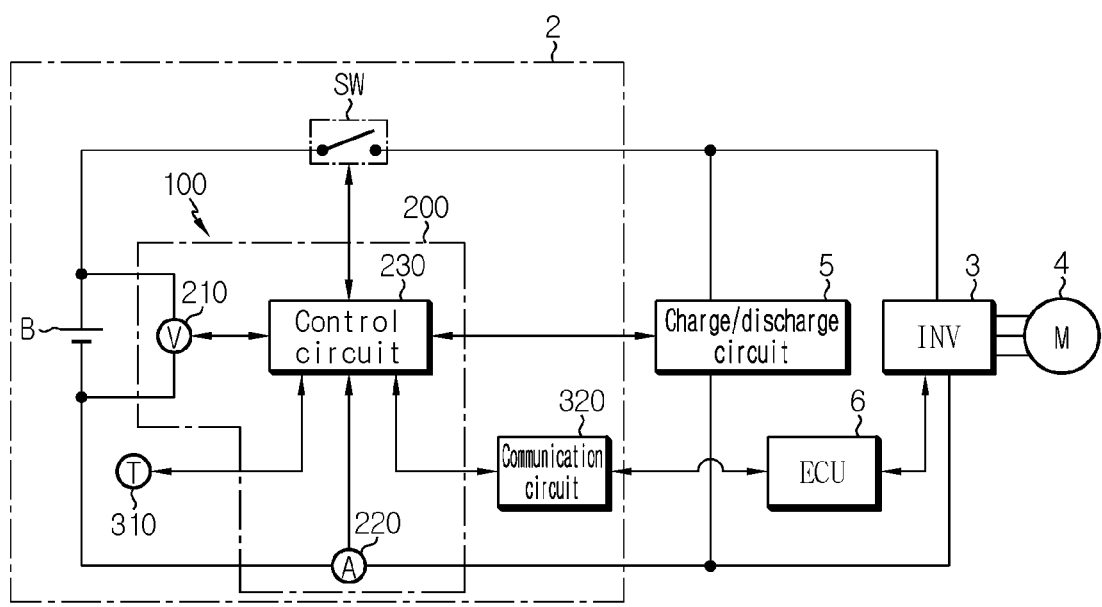
FIG. 1 is an exemplary diagram showing an electric vehicle according to the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and may be implemented by hardware and software either alone or in combination.

In addition, throughout the specification, it will be further understood that when an element is referred to as being "connected to" another element, it can be directly connected to the other element or intervening elements may be present.

FIG. 1 is an exemplary diagram showing an electric vehicle according to the present disclosure.

Referring to FIG. 1, the electric vehicle 1 includes a battery pack 2, an inverter 3, an electric motor 4, a charge/discharge circuit 5 and a vehicle controller 6.

The battery pack 2 includes a battery B, a switch SW and a battery management system 100.

The battery B may be coupled to the inverter 3 and/or the charge/discharge circuit 5 through a pair of power terminals provided in the battery pack 2. The battery B is a rechargeable battery, and may be, for example, a lithium ion battery.

The inverter 3 is provided to convert the direct current (DC) from the battery B to alternating current (AC) in response to a command from the battery management system 100. The electric motor 4 may be, for example, a 3-phase AC motor. The electric motor 4 operates using the AC from the inverter 3.

The switch SW is connected in series to the battery B. The switch SW is installed on a current path for the charge/discharge of the battery B. The on/off control of the switch SW is performed in response to a switching signal from the battery management system 100. The switch SW may be a mechanical relay that is turned on/off by the magnetic force of a coil or a semiconductor switching device such as a Metal Oxide Semiconductor Field Effect transistor (MOSFET).

The charge/discharge circuit 5 is provided to regulate the charge power and the discharge power for the battery B in response to a command from the control circuit 230. When the battery voltage of the battery B is equal to or lower than a lower voltage limit $V_L$ of a set voltage range as described below, the control circuit 230 may command constant current charge to the charge/discharge circuit 5. When the battery voltage of the battery B is equal to or higher than an upper voltage limit $V_U$ of the set voltage range, the control circuit 230 may command constant current discharge to the charge/discharge circuit 5.

The battery management system 100 is provided to take responsibility for overall control in relation to the charge/discharge of the battery B. The battery management system 100 includes a battery diagnosis apparatus 200. The battery management system 100 may further include at least one of a temperature sensor 310 or a communication circuit 320. Hereinafter, it is assumed that the battery management system 100 includes the battery diagnosis apparatus 200, the temperature sensor 310 and the communication circuit 320.

The battery diagnosis apparatus 200 includes a voltage sensor 210, a current sensor 220 and a control circuit 230.

The voltage sensor 210 is connected in parallel to the battery B, and is configured to detect a battery voltage across the battery B, and generate a voltage signal indicating the detected battery voltage.

The current sensor 220 is connected in series to the battery B through the current path. The current sensor 220 is configured to detect a battery current flowing through the battery B, and generate a current signal indicating the detected battery current.

The temperature sensor 310 is configured to detect a temperature of the battery B, and generate a temperature signal indicating the detected temperature.

The control circuit 230 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing the other functions.

The control circuit 230 may have a memory device. The memory device may include, for example, at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) or programmable read-only memory (PROM). The memory device may store data and programs required for computation by the control circuit 230. The memory device may store data indicating the result of computation by the control circuit 230.

The control circuit 230 may be operably coupled to the switch SW, the charge/discharge circuit 5, the voltage sensor 210, the current sensor 220, the temperature sensor 310 and/or the communication circuit 320. Operably coupled refers to connected to transmit and receive a signal in one or two directions. The control circuit 230 may periodically or aperiodically collect a sensing signal in a repeated manner. The sensing signal indicates the synchronization-detected voltage signal, current signal and/or temperature signal.

The control circuit 230 may determine a state of charge (SOC) of the battery B based on the sensing signal at a predetermined time interval during the charge/discharge of the battery B. The well-known algorithms such as ampere counting, an SOC-open circuit voltage (OCV) curve and Kalman filter may be used to determine the SOC.

The communication circuit 320 may include a communication circuit configured to support wired or wireless communication between the control circuit 230 and the vehicle controller 6 (for example, an Electronic Control Unit (ECU)). The wired communication may be, for example, controller area network (CAN) communication, and the wireless communication may be, for example, Zigbee or Bluetooth communication. The communication protocol is not limited to a particular type and may include any communication protocol for supporting wired/wireless communication between the control circuit 230 and the vehicle controller 6

The communication circuit 320 may include an output device (for example, a display, a speaker) to provide information received from the vehicle controller 6 and/or the control circuit 230 in a recognizable form. The vehicle controller 6 may control the inverter 3 based on battery information (for example, voltage, current, temperature, SOC) collected via communication with the battery management system 100.

Figure 2:
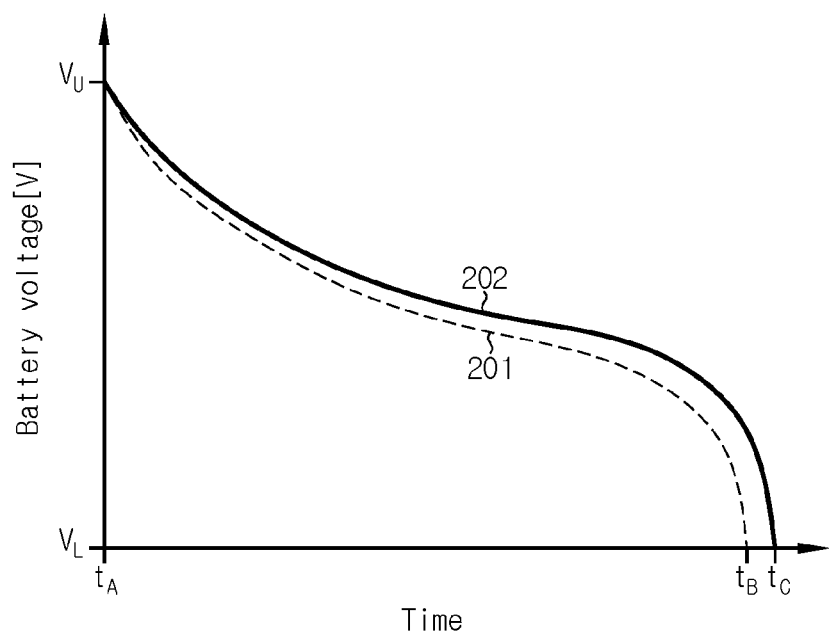
FIG. 2 is an exemplary diagram showing a capacity curve obtained through a constant current procedure of a battery shown in FIG. 1.

FIG. 2 is an exemplary diagram showing a capacity curve obtained through the constant current procedure of the battery shown in FIG. 1.

Referring to FIG. 2, a measured capacity curve 201 indicates a relationship between battery voltage and residual capacity of the degraded battery B obtained through the constant current procedure. A reference capacity curve 202 indicates a relationship between battery voltage and residual capacity of a sample battery in fresh condition obtained through the constant current procedure. The sample battery is fabricated with the same electrochemical specification as the battery B. The fresh condition refers to a completely new and faultless condition.

The constant current procedure is a discharge or charge event of the battery B using a predetermined current rate (for example, 0.1 C-rate) for a constant current period from the time at which the battery voltage is equal to any one of the upper voltage limit $V_U$ or the lower voltage limit $V_L$ of a predetermined set voltage range to the time at which the battery voltage reaches the other. The upper voltage limit $V_U$ (for example, 4.2 V) is preset below a predetermined end-of-charge voltage to which the charge of the battery B is allowed. The lower voltage limit $V_L$ (for example, 3.0 V) is preset above a predetermined end-of-discharge voltage to which the discharge of the battery B is allowed.

FIG. 2 shows the two capacity curves 201, 202 obtained through the discharge event for the constant current period. The control circuit 230 may determine the measured capacity curve 201 based on the voltage signal and the current signal collected and recorded at each unit time over the constant current period. As the battery B degrades, the full charge capacity decreases, and thus the time $t_B$ at which the measured capacity curve 201 reaches the lower voltage limit $V_L$ is earlier than the time $t_C$ at which the reference capacity curve 202 reaches the lower voltage limit $V_L$. As the battery B degrades, the shape of the measured capacity curve 201 changes, and thus a difference between the reference capacity curve 202 and the measured capacity curve 201 gradually increases.

Figure 3:
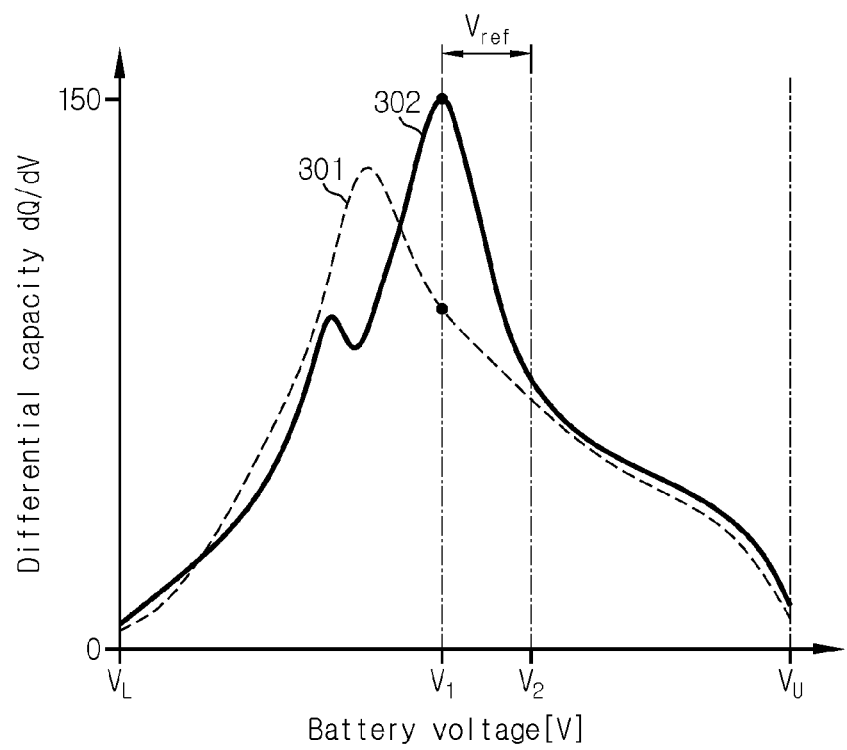
FIG. 3 is an exemplary diagram showing differential curves associated with the capacity curves shown in FIG. 2.
Figure 4:
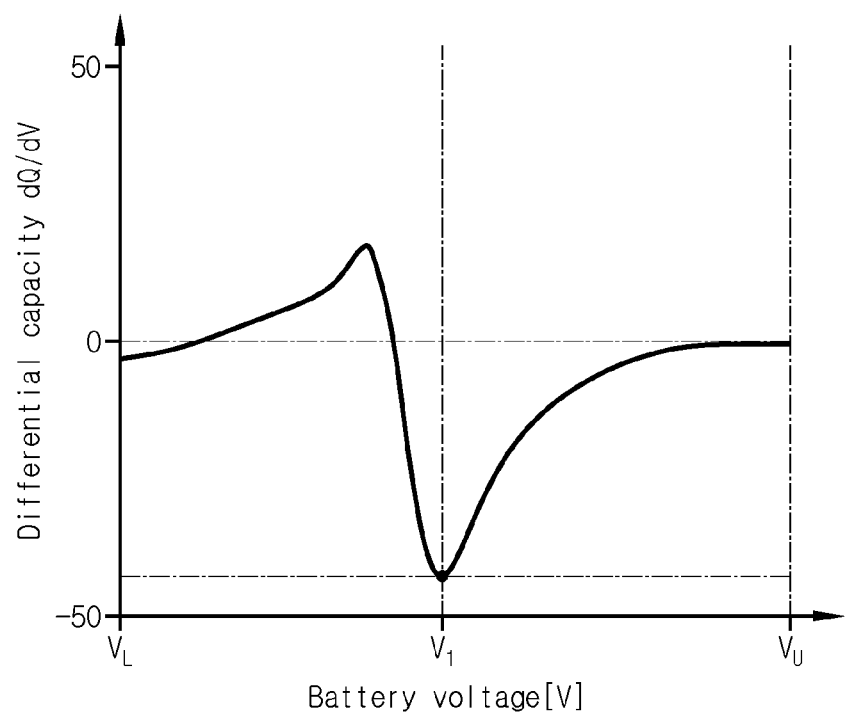
FIG. 4 is an exemplary diagram showing a differential capacity difference between the differential curves shown in FIG. 3.

FIG. 3 is an exemplary diagram showing differential curves associated with the capacity curves shown in FIG. 2, and FIG. 4 is an exemplary diagram showing a differential capacity difference between the differential curves shown in FIG. 3.

Referring to FIG. 3, a measured differential curve 301 is a dataset that may be obtained from the measured capacity curve 201 of FIG. 2, and indicates a relationship between (i) the battery voltage V and (ii) the differential capacity dQ/dV, including a time series defining the measured capacity curve 201. The differential capacity dQ/dV is a ratio of a change dQ in the residual capacity Q for each unit time to a change dV in the battery voltage V for each unit time. For example, the control circuit 230 may determine an approximate capacity curve which is the result of fitting the relationship between battery voltage and residual capacity of the measured capacity curve 201 of FIG. 2 to a polynomial function through curve fitting. A noise component present in the measured capacity curve 201 is removed by converting the measured capacity curve 201 to the approximate capacity curve. Subsequently, the control circuit 230 may obtain the measured differential curve 301 as a result of differentiating the approximate capacity curve with respect to the input variable, i.e., the battery voltage.

A reference differential curve 302 is a time-series dataset that may be obtained from the reference capacity curve 202 of FIG. 2, and indicates a relationship between (i) the battery voltage and (ii) the differential capacity, including a time series defining the reference capacity curve 202. That is, the reference differential curve 302 may be given as a result of differentiating the residual capacity of the reference capacity curve 202 with respect to the battery voltage.

Each of the above-described curves 201, 202, 301, 302 may be treated as a type of signal (time-series). The control circuit 230 may determine whether the negative electrode tortuosity of the battery B abnormally increased by comparing the measured differential curve 301 with the reference differential curve 302. The control circuit 230 may calculate a difference in differential capacity between the differential curves 301, 302 over the set voltage range from the upper voltage limit $V_U$ to the lower voltage limit $V_L$. FIG. 4 shows the result of subtracting the differential capacity of the reference differential curve 302 from the differential capacity of the measured differential curve 301 over the set voltage range.

The control circuit 230 may determine a first voltage of interest which is a voltage at which the size of the difference in differential capacity is at maximum. The first voltage of interest may be determined within the voltage range in which the measured differential curve 301 has a smaller differential capacity than the reference differential curve 302. In FIG. 4, the differential capacity difference between the measured differential curve 301 and the reference differential curve 302 is at minimum at a voltage $V_1$ within the set voltage range, and thus the control circuit 230 may determine the voltage $V_1$ as the first voltage of interest. Additionally, the control circuit 230 determines a second voltage of interest $V_2$ based on the first voltage of interest $V_1$. The second voltage of interest $V_2$ may be equal to a smaller one of the sum of (i) the first voltage of interest V and a reference voltage $V_{ref}$ and (ii) the upper voltage limit $V_U$.

The reference voltage $V_{ref}$ may be given as an optimal width (for example, 0.3 V) of the voltage range of interest required to measure a similarity of the two differential curves.

Alternatively, the control circuit 230 may determine the reference voltage $V_{ref}$ based on the cumulative charge/discharge capacity of the battery B. The memory device may pre-record a look-up table defining a predetermined correlation between the cumulative charge/discharge capacity and the reference voltage. In the look-up table, the reference voltage may have a linear or nonlinear inversely proportional relationship to the cumulative charge/discharge capacity. That is, in the look-up table, the larger cumulative charge/discharge capacity may be associated with the smaller reference voltage. As the battery B degrades, the measured differential curve 301 has a large difference from the reference differential curve 302. Accordingly, when the reference voltage $V_{ref}$ which is the width of the voltage range of interest decreases with the increasing cumulative charge/discharge capacity of the battery B, it is possible to compare the differential curve 301 and the reference differential curve 302 with sufficient accuracy at low computational complexity for similarity measurement.

The control circuit 230 may determine a signal distance between the measured differential curve 301 and the reference differential curve 302 over the voltage range of interest from the first voltage of interest $V_1$ to the second voltage of interest $V_2$. As the measured differential curve 301 and the reference differential curve 302 are more similar to each other in the voltage range of interest, the signal distance decreases. At least one of a variety of well-known similarity calculation methods such as the Pearson correlation coefficient may be used to determine the signal distance. In relation to this, due to the internal resistance of the battery B, as the battery B degrades, the battery voltage in the discharging procedure is shifted to low voltage while the battery voltage in the charging procedure is shifted to high voltage. Accordingly, in determining the signal distance, dynamic time warping which is a function of outputting the signal distance between two signals having different patterns as similarity may be used to offset the shift of the battery voltage during charging/discharging.

The control circuit 230 may determine that the negative electrode tortuosity of the battery B abnormally increased when the signal distance is found equal to or larger than the reference distance as a result of comparing the signal distance with a reference distance. The abnormal increase in the negative electrode tortuosity of the battery B indicates that the negative electrode tortuosity of the battery B is equal to or larger than the upper limit value of the negative electrode tortuosity corresponding to the cumulative charge/discharge capacity of the battery B. The cumulative charge/discharge capacity may be the sum of the cumulative value of discharge current and the cumulative value of charge current flowing through the battery B for the total usage duration from the release time of the battery B to the start time (or the end time) of the constant current period. The signal distance corresponds to the negative electrode tortuosity of the battery B, and the reference distance corresponds to the upper limit value of the negative electrode tortuosity corresponding to the cumulative charge/discharge capacity of the battery B. To compare the signal distance with the reference distance, the control circuit 230 may determine the reference distance using the following equation pre-recorded in the memory device.

$$y = \sum_{i=0}^{m} C[i] \times x^i \quad \text{(Equation)}$$

In the above equation, m denotes a predetermine natural number, $C[i]$ denotes an $i^{th}$ predetermined positive coefficient, x denotes the cumulative charge/discharge capacity, and y denotes the reference distance. The above equation may be preset through testing (or computing simulation) for obtaining a relationship between the cumulative charge/discharge capacity and the negative electrode tortuosity of sample batteries having the same electrochemical specification as the battery B.

When it is determined that the negative electrode tortuosity of the battery B abnormally increased, the control circuit 230 may perform a predetermined safety function. In an example, the control circuit 230 may transmit a warning message to the vehicle controller 6 through the communication circuit 320. In another example, the control circuit 230 may reduce the maximum allowable value of the charge current and/or the discharge current. The reduction in the maximum allowable value may be proportional to a difference between the signal distance and the reference distance.

Figure 5:
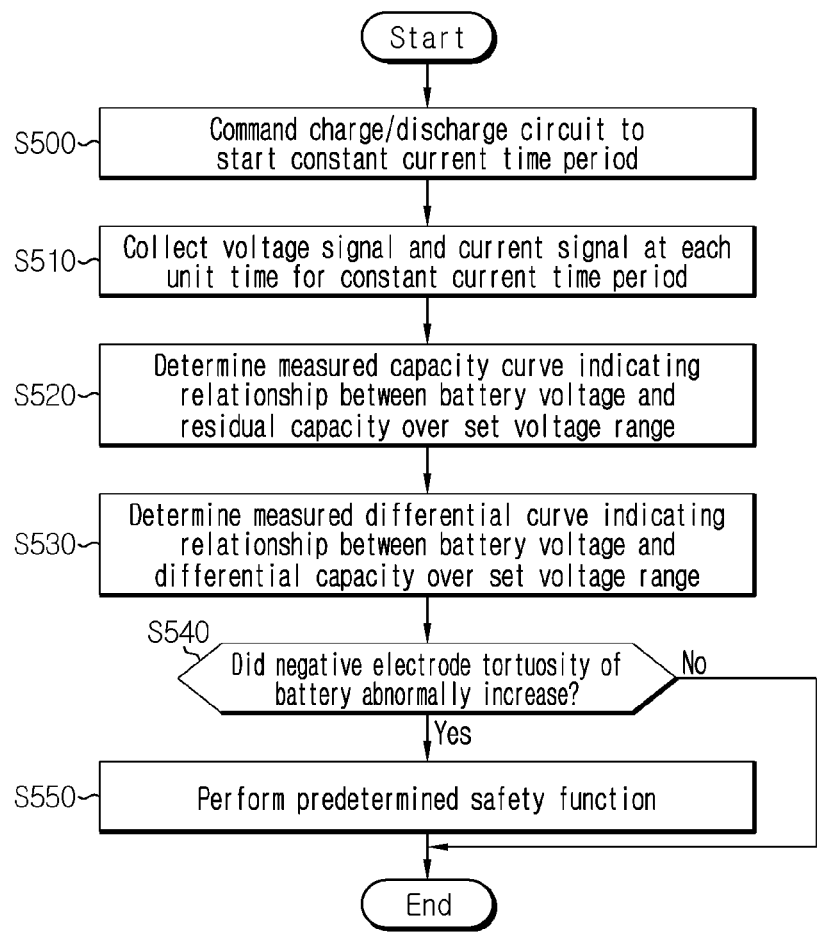
FIG. 5 is an exemplary flowchart showing a battery diagnosis method that may be performed by a battery diagnosis apparatus shown in FIG. 1.
Figure 6:
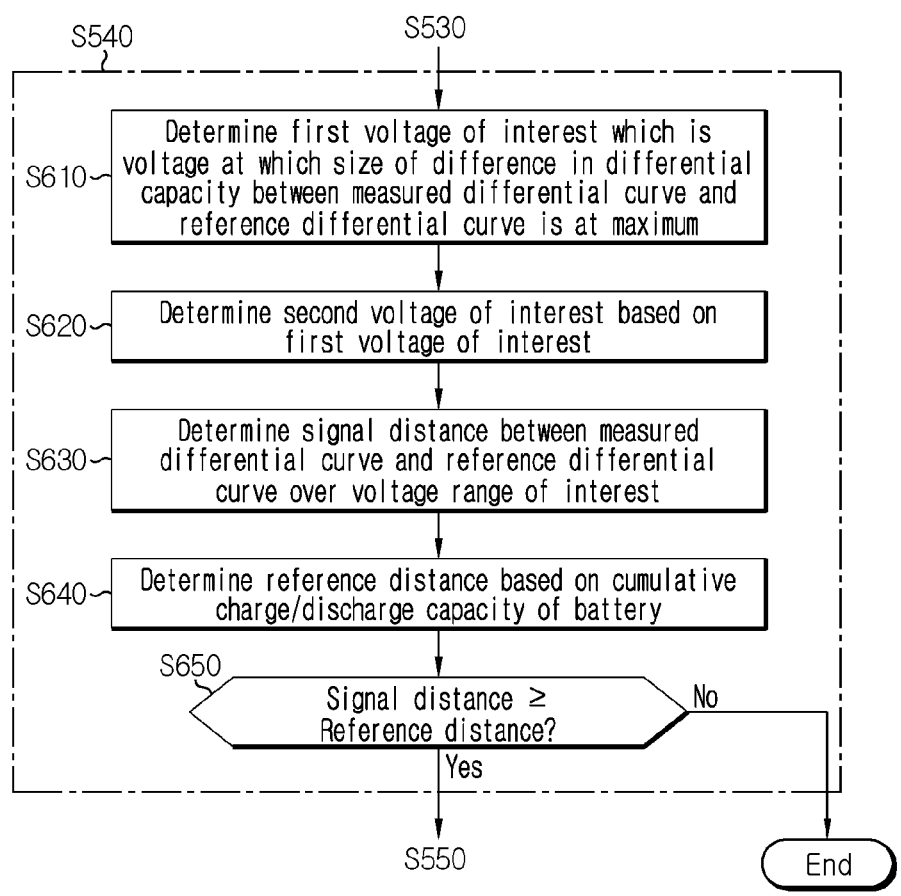
FIG. 6 is an exemplary flowchart showing the sub-steps of the step S540 of FIG. 5.

FIG. 5 is an exemplary flowchart showing a battery diagnosis method that may be performed by the battery diagnosis apparatus shown in FIG. 1, and FIG. 6 is an exemplary flowchart showing the sub-steps of the step S540 of FIG. 5.

Referring to FIGS. 1 to 5, in step S500, the control circuit 230 commands the charge/discharge circuit 5 to start the constant current period. The constant current period is a period of time during which the battery B is charged or discharged at the predetermined current rate over the predetermined set voltage range $V_L \sim V_U$.

In step S510, the control circuit 230 collects the voltage signal and the current signal at each unit time for the constant current period. That is, the control circuit 230 generates a time series of battery voltage and a time series of battery current over the constant current period.

In step S520, the control circuit 230 determines the measured capacity curve 201 indicating the relationship between the battery voltage and the residual capacity over the set voltage range based on the voltage signal and the current signal collected for the constant current period.

In step S530, the control circuit 230 determines the measured differential curve 301 indicating the relationship between the battery voltage and the differential capacity over the set voltage range based on the measured capacity curve 201. The differential capacity is a ratio dQ/dV of a change in the residual capacity for each unit time to a change in the battery voltage for each unit time.

In step S540, the control circuit 230 determines whether the negative electrode tortuosity of the battery B abnormally increased by comparing the measured differential curve 301 with the reference differential curve 302. When a value of the step S540 is "Yes", step S550 may be performed.

In step S550, the control circuit 230 performs the predetermined safety function.

Referring to FIG. 6, in step S610, the control circuit 230 determines the first voltage of interest $V_1$ which is a voltage at which a size of a difference in differential capacity between the measured differential curve 301 and the reference differential curve 302 is at maximum.

In step S620, the control circuit 230 determines the second voltage of interest $V_2$ based on the first voltage of interest $V_1$. The second voltage of interest may be equal to one (for example, a smaller one) of the sum of (i) the first voltage of interest $V_1$ and the reference voltage $V_{ref}$ (for example, 0.3 V) and (ii) the upper voltage limit $V_U$.

In step S630, the control circuit 230 determines the signal distance between the measured differential curve 301 and the reference differential curve 302 over the voltage range of interest between the first voltage of interest $V_1$ as the lower limit and the second voltage of interest $V_2$ as the upper limit.

In step S640, the control circuit 230 determines the reference distance based on the cumulative charge/discharge capacity of the battery B (see Equation). Alternatively, as described above, when the reference voltage $V_{ref}$ is determined based on the cumulative charge/discharge capacity, the step S640 may be omitted and the predetermined value may be used as the reference distance.

In step S650, the control circuit 230 determines whether the signal distance is equal to or larger than the reference distance. The signal distance that is equal to or larger than the reference distance indicates that the negative electrode tortuosity of the battery B abnormally increased above an expected upper limit value from the cumulative charge/discharge capacity of the battery B.

The embodiments of the present disclosure described hereinabove are not implemented only through the apparatus and method, and may be implemented through programs that perform the functions corresponding to the configurations of the embodiments of the present disclosure or recording media having the programs recorded thereon, and such implementation may be easily achieved by those skilled in the art from the disclosure of the embodiments described above.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and all or some of the embodiments may be selectively combined to allow various modifications.

DESCRIPTION OF REFERENCE NUMERALS

1: Electric vehicle
2: Battery pack
B: Battery
100: Battery management system
200: Battery diagnosis apparatus
210: Voltage sensor
220: Current sensor
230: Control circuit

What is claimed is:

1. A battery diagnosis apparatus, comprising:
a voltage sensor configured to measure a battery voltage across a battery and generate a voltage signal indicating the measured battery voltage;
a current sensor configured to measure a battery current flowing through the battery and generate a current signal indicating the measured battery current; and
a control circuit configured to:
collect the voltage signal and the current signal at each unit time;
determine a measured capacity curve indicating a relationship between the battery voltage and a residual capacity over a predetermined set voltage range based on the voltage signal and the current signal collected at each unit time for a constant current period during which the battery is charged or discharged at a predetermined current rate over the set voltage range;
determine a measured differential curve indicating a relationship between the battery voltage and a measured differential capacity over the set voltage range based on the measured capacity curve, wherein the measured differential capacity is a ratio of a change in the residual capacity for each unit time to a change in the battery voltage for each unit time;
compare the measured differential curve with a reference differential curve, wherein the reference differential curve indicates a relationship between the battery voltage and a reference differential capacity over the set voltage range when the battery is in fresh condition; and
determine whether there is an abnormal increase to negative electrode tortuosity of the battery based on the comparison; and
perform a predetermined safety function when it is determined that there is the abnormal increase to negative electrode tortuosity of the battery, wherein the predetermined safety function includes a function that reduces a maximum allowable value of a charge current and/or a discharge current.

2. The battery diagnosis apparatus according to claim 1, wherein the control circuit is configured to:
determine an approximate measured capacity curve by fitting the measured capacity curve to a polynomial function; and
determine the measured differential curve by differentiating a residual capacity of the approximate measured capacity curve with respect to the battery voltage.

3. The battery diagnosis apparatus according to claim 1, wherein the control circuit is configured to:
determine a first voltage of interest at which a difference between the measured differential capacity of the measured differential curve and the reference differential capacity of the reference differential curve is at maximum;
determine a signal distance between the measured differential curve and the reference differential curve over a voltage range of interest from the first voltage of interest to a second voltage of interest larger than the first voltage of interest; and
determine the abnormal increase to negative electrode tortuosity of the battery in response to the signal distance being equal to or larger than a reference distance.

4. The battery diagnosis apparatus according to claim 3, wherein the control circuit is configured to determine the second voltage of interest to be equal to a smaller one of (i) a sum of the first voltage of interest and a reference voltage, or (ii) an upper voltage limit.

5. The battery diagnosis apparatus according to claim 3, wherein the control circuit is configured to determine the signal distance using dynamic time warping.

6. The battery diagnosis apparatus according to claim 3, wherein the control circuit is configured to:
determine a cumulative charge/discharge capacity of the battery over a total usage duration of the battery; and
determine the reference distance based on the cumulative charge/discharge capacity.

7. The battery diagnosis apparatus according to claim 6, wherein the control circuit is configured to determine the reference distance using:

$$y = \sum_{i=0}^{m} C[i] \times x^i$$

wherein m is a predetermined natural number, $C[i]$ is an $i^{th}$ predetermined positive coefficient, x is the cumulative charge/discharge capacity, and y is the reference distance.

8. A battery pack comprising the battery diagnosis apparatus according to any claim 1.

9. An electric vehicle comprising the battery pack according to claim 8.

10. A battery diagnosis method comprising:
determining, by a control circuit, a measured capacity curve indicating a relationship between (i) a battery voltage measured across a battery and (ii) a residual capacity over a predetermined set voltage range based on a voltage signal and a current signal collected at each unit time for a constant current period during which the battery is charged or discharged at a predetermined current rate over the set voltage range;
determining, by the control circuit, a measured differential curve indicating a relationship between (i) the battery voltage and (ii) a measured differential capacity over the set voltage range based on the measured capacity curve, wherein the measured differential capacity is a ratio of a change in the residual capacity for each unit time to a change in the battery voltage for each unit time;
comparing, by the control circuit, the measured differential curve with the reference differential curve, wherein the reference differential curve indicates the relationship between the battery voltage and a reference differential capacity over the set voltage range when the battery is in fresh condition;

determining, by the control circuit, an abnormal increase to negative electrode tortuosity of the battery based on the comparison; and performing, by the control circuit, a predetermined safety function when it is determined that there is the abnormal increase to negative electrode tortuosity of the battery, wherein the predetermined safety function includes a function that reduces a maximum allowable value of a charge current and/or a discharge current.

* * * * *